(12) United States Patent
Dorogusker et al.

(10) Patent No.: US 8,615,089 B2
(45) Date of Patent: Dec. 24, 2013

(54) DYNAMIC POWER MANAGEMENT IN A PORTABLE MEDIA DELIVERY SYSTEM

(75) Inventors: Jesse L. Dorogusker, Menlo Park, CA (US); Donald J. Novotney, San Jose, CA (US); Scott Krueger, Mountain View, CA (US); Robert Michelet, Annapolis, MD (US); Jeffrey Allan Hammerstrom, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 12/944,095

(22) Filed: Nov. 11, 2010

(65) Prior Publication Data
US 2011/0085672 A1    Apr. 14, 2011

Related U.S. Application Data

(62) Division of application No. 11/364,610, filed on Feb. 27, 2006, now Pat. No. 7,848,527.

(51) Int. Cl.
*H03G 11/00* (2006.01)
*H04B 15/00* (2006.01)

(52) U.S. Cl.
USPC ............................. 381/55; 381/94.5; 330/51

(58) Field of Classification Search
USPC .......... 381/55, 58, 59, 77, 79, 111, 124, 94.1, 381/94.5; 700/94; 713/300, 320, 324, 330, 713/340; 330/51
See application file for complete search history.

(56) References Cited

U.S. PATENT DOCUMENTS

| | | |
|---|---|---|
| 1,419,828 A | 6/1922 | Dornier |
| 4,090,216 A | 5/1978 | Constable |
| 4,257,098 A | 3/1981 | Lacy |
| 4,386,345 A | 5/1983 | Narveson et al. |
| 4,451,849 A | 5/1984 | Fuhrer |
| 4,589,022 A | 5/1986 | Prince et al. |
| 4,673,861 A | 6/1987 | Dubovsky et al. |
| 4,908,523 A | 3/1990 | Snowden et al. |
| 4,928,307 A | 5/1990 | Lynn |
| 4,951,171 A | 8/1990 | Tran et al. |
| 4,965,738 A | 10/1990 | Bauer et al. |

(Continued)

FOREIGN PATENT DOCUMENTS

| | | |
|---|---|---|
| DE | 43 34 773 A1 | 4/1994 |
| DE | 44 45 023 A1 | 6/1996 |

(Continued)

OTHER PUBLICATIONS

Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate.. Downloaded Aug. 16, 2006.

(Continued)

*Primary Examiner* — Xu Mei
(74) *Attorney, Agent, or Firm* — Womble Carlyle Sandridge & Rice LLP

(57) ABSTRACT

A consumer electronic product (e.g., a portable media player ported to a media delivery accessory) is powered by a limited capacity DC power source (such as a battery or mini-fuel cell). The consumer electronic product limits the maximum allowable sound pressure level (SPL) that can be produced by the speakers. In one embodiment, the maximum allowable SPL is based upon an amount of stored energy available in the limited capacity DC power source.

20 Claims, 13 Drawing Sheets

(56) References Cited

U.S. PATENT DOCUMENTS

| | | |
|---|---|---|
| 5,019,717 A | 5/1991 | McCurry et al. |
| 5,103,156 A | 4/1992 | Jones et al. |
| 5,150,031 A | 9/1992 | James et al. |
| 5,185,906 A | 2/1993 | Brooks |
| 5,200,685 A | 4/1993 | Sakamoto |
| 5,206,538 A | 4/1993 | Orta |
| 5,252,891 A | 10/1993 | Huang |
| 5,293,494 A | 3/1994 | Saito et al. |
| 5,304,916 A | 4/1994 | Le et al. |
| 5,307,002 A | 4/1994 | Ho et al. |
| 5,349,281 A | 9/1994 | Bugaj |
| 5,371,456 A | 12/1994 | Brainard |
| 5,379,057 A | 1/1995 | Clough |
| 5,396,163 A | 3/1995 | Nor et al. |
| 5,402,055 A | 3/1995 | Nguyen |
| 5,406,305 A | 4/1995 | Shimomura et al. |
| 5,471,128 A | 11/1995 | Patino et al. |
| 5,498,950 A | 3/1996 | Ouwerkerk |
| 5,514,945 A | 5/1996 | Jones |
| 5,539,298 A | 7/1996 | Perkins et al. |
| 5,559,945 A | 9/1996 | Beaudet et al. |
| 5,566,337 A | 10/1996 | Szymanski et al. |
| 5,579,489 A | 11/1996 | Dornier et al. |
| 5,583,993 A | 12/1996 | Foster et al. |
| 5,602,455 A | 2/1997 | Stephens et al. |
| 5,608,698 A | 3/1997 | Yamanoi et al. |
| 5,616,876 A | 4/1997 | Cluts |
| 5,617,386 A | 4/1997 | Choi |
| 5,648,712 A | 7/1997 | Hahn |
| 5,670,985 A | 9/1997 | Cappels, Sr. et al. |
| 5,675,362 A | 10/1997 | Clough |
| 5,675,813 A | 10/1997 | Holmdahl |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,752,046 A | 5/1998 | Oprescu et al. |
| 5,754,027 A | 5/1998 | Oglesbee et al. |
| 5,760,588 A | 6/1998 | Bailey |
| 5,778,374 A | 7/1998 | Dang et al. |
| 5,803,786 A | 9/1998 | McCormick |
| 5,805,433 A | 9/1998 | Wood |
| 5,808,446 A | 9/1998 | Eguchi |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,845,217 A | 12/1998 | Lindell et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A * | 7/1999 | Hallowell et al. ............. 713/340 |
| 5,923,757 A | 7/1999 | Hocker et al. |
| 5,952,992 A | 9/1999 | Helms |
| 5,955,867 A | 9/1999 | Cummings et al. |
| 5,955,869 A | 9/1999 | Rathmann |
| 5,964,879 A | 10/1999 | Dunstan et al. |
| 5,982,141 A | 11/1999 | Hinohara |
| 6,006,274 A | 12/1999 | Hawkins et al. |
| 6,007,372 A | 12/1999 | Wood |
| 6,009,237 A | 12/1999 | Hirabayashi et al. |
| 6,011,585 A | 1/2000 | Anderson |
| 6,018,705 A | 1/2000 | Gaudet et al. |
| 6,025,695 A | 2/2000 | Friel et al. |
| 6,041,023 A | 3/2000 | Lakhansingh |
| 6,052,654 A | 4/2000 | Gaudet et al. |
| 6,087,804 A | 7/2000 | Suda |
| 6,108,426 A | 8/2000 | Stortz |
| 6,122,340 A | 9/2000 | Darley et al. |
| 6,125,455 A | 9/2000 | Yeo |
| 6,130,518 A | 10/2000 | Gabehart et al. |
| 6,151,652 A | 11/2000 | Kondo et al. |
| 6,152,778 A | 11/2000 | Dalton |
| 6,158,019 A | 12/2000 | Squibb |
| 6,161,944 A | 12/2000 | Leman |
| 6,167,289 A | 12/2000 | Ball et al. |
| 6,169,387 B1 | 1/2001 | Kaib |
| 6,172,948 B1 | 1/2001 | Keller et al. |
| 6,178,514 B1 | 1/2001 | Wood |
| 6,179,432 B1 | 1/2001 | Zhang et al. |
| 6,184,652 B1 | 2/2001 | Yang |
| 6,184,655 B1 | 2/2001 | Malackowski |
| 6,185,163 B1 | 2/2001 | Bickford et al. |
| 6,191,939 B1 | 2/2001 | Burnett |
| 6,195,754 B1 | 2/2001 | Jardine et al. |
| 6,204,637 B1 | 3/2001 | Rengan |
| 6,208,044 B1 | 3/2001 | Viswanadham et al. |
| 6,211,581 B1 | 4/2001 | Farrant |
| 6,211,649 B1 | 4/2001 | Matsuda |
| 6,216,131 B1 | 4/2001 | Liu et al. |
| 6,217,183 B1 | 4/2001 | Shipman |
| 6,218,812 B1 | 4/2001 | Hanson |
| 6,248,946 B1 | 6/2001 | Dwek |
| 6,252,380 B1 | 6/2001 | Koenck |
| 6,261,109 B1 | 7/2001 | Liu et al. |
| 6,271,605 B1 | 8/2001 | Carkner et al. |
| 6,283,789 B1 | 9/2001 | Tsai |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,316,916 B2 | 11/2001 | Bohne |
| 6,329,796 B1 | 12/2001 | Popescu |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,348,776 B2 | 2/2002 | Kim |
| 6,353,894 B1 | 3/2002 | Pione |
| 6,357,011 B2 | 3/2002 | Gilbert |
| 6,357,147 B1 | 3/2002 | Darley et al. |
| 6,362,610 B1 | 3/2002 | Yang |
| 6,363,491 B1 | 3/2002 | Endo |
| 6,377,530 B1 | 4/2002 | Burrows |
| 6,392,414 B2 | 5/2002 | Bertness |
| 6,448,863 B1 | 9/2002 | Ogawa et al. |
| 6,452,610 B1 | 9/2002 | Reinhardt et al. |
| 6,465,909 B1 | 10/2002 | Soo et al. |
| 6,467,924 B2 | 10/2002 | Shipman |
| 6,487,442 B1 | 11/2002 | Wood |
| 6,489,751 B2 | 12/2002 | Small et al. |
| 6,493,652 B1 | 12/2002 | Ohlenbusch et al. |
| 6,526,516 B1 | 2/2003 | Ishikawa et al. |
| 6,531,845 B2 | 3/2003 | Kerai et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,571,343 B1 | 5/2003 | Johnson et al. |
| 6,580,460 B1 | 6/2003 | Takahashi et al. |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,614,232 B1 | 9/2003 | Mukai |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,633,932 B1 | 10/2003 | Bork et al. |
| 6,650,232 B1 | 11/2003 | Strohbeck et al. |
| 6,693,612 B1 | 2/2004 | Matsumoto et al. |
| 6,731,312 B2 | 5/2004 | Robbin |
| 6,731,751 B1 | 5/2004 | Papadopoulos |
| 6,747,859 B2 | 6/2004 | Walbeck et al. |
| 6,760,536 B1 | 7/2004 | Amir et al. |
| 6,762,741 B2 | 7/2004 | Weindorf |
| 6,774,604 B2 | 8/2004 | Matsuda et al. |

(56) References Cited

U.S. PATENT DOCUMENTS

| | | |
|---|---|---|
| 6,781,611 B1 | 8/2004 | Richard |
| 6,794,566 B2 | 9/2004 | Pachet |
| 6,799,226 B1 | 9/2004 | Robbin et al. |
| 6,801,964 B1 | 10/2004 | Mahdavi |
| 6,820,206 B1 | 11/2004 | Kim et al. |
| 6,832,373 B2 | 12/2004 | O'Neill |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Blackadar et al. |
| 6,911,971 B2 | 6/2005 | Suzuki et al. |
| 6,917,504 B2 | 7/2005 | Nguyen et al. |
| 6,918,677 B2 | 7/2005 | Shipman |
| 6,931,377 B1 | 8/2005 | Seya |
| 6,934,812 B1 | 8/2005 | Robbin et al. |
| 6,936,936 B2 | 8/2005 | Fischer et al. |
| 6,946,817 B2 | 9/2005 | Fischer et al. |
| 6,950,087 B2 | 9/2005 | Knox et al. |
| 6,969,970 B2 | 11/2005 | Dias et al. |
| 6,993,615 B2 | 1/2006 | Falcon |
| 6,995,963 B2 | 2/2006 | Fadell et al. |
| 7,016,595 B1 | 3/2006 | Ishino et al. |
| 7,023,778 B2 | 4/2006 | Takashima |
| 7,028,096 B1 | 4/2006 | Lee |
| 7,046,230 B2 | 5/2006 | Zadesky |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,143,241 B2 | 11/2006 | Hull |
| 7,146,437 B2 | 12/2006 | Robbin et al. |
| 7,160,113 B2 | 1/2007 | McConnell et al. |
| 7,171,331 B2 | 1/2007 | Vock et al. |
| 7,191,244 B2 | 3/2007 | Jennings et al. |
| 7,197,650 B2 | 3/2007 | Watanabe et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,489,923 B2 * | 2/2009 | Varanda .................... 455/418 |
| 7,508,535 B2 | 3/2009 | Hart et al. |
| 7,725,135 B2 | 5/2010 | Kim et al. |
| 7,770,036 B2 * | 8/2010 | Dorogusker et al. ......... 713/300 |
| 7,848,527 B2 * | 12/2010 | Dorogusker et al. ........... 381/55 |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2001/0013983 A1 | 8/2001 | Izawa et al. |
| 2001/0029178 A1 | 10/2001 | Criss et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 | 5/2002 | Hudson et al. |
| 2002/0059499 A1 | 5/2002 | Hudson |
| 2002/0070705 A1 | 6/2002 | Buchanan et al. |
| 2002/0090912 A1 | 7/2002 | Cannon et al. |
| 2002/0116082 A1 | 8/2002 | Gudorf |
| 2002/0116517 A1 | 8/2002 | Hudson et al. |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0156949 A1 | 10/2002 | Kubo et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0110403 A1 | 6/2003 | Crutchfield et al. |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0189418 A1 * | 10/2003 | Schinner ...................... 320/136 |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0162029 A1 | 8/2004 | Grady |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0225804 A1 | 11/2004 | Leete |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0218303 A1 | 10/2005 | Poplin |
| 2005/0234983 A1 | 10/2005 | Plastina et al. |
| 2005/0245839 A1 | 11/2005 | Stivoric et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2006/0013414 A1 | 1/2006 | Shih |
| 2006/0025068 A1 | 2/2006 | Regan et al. |
| 2006/0039263 A1 | 2/2006 | Trotabas |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |

(56) References Cited

U.S. PATENT DOCUMENTS

| | | |
|---|---|---|
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0125446 A1 | 6/2006 | Tupman et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0212637 A1 | 9/2006 | Lo et al. |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0106660 A1 | 5/2007 | Stern et al. |
| 2007/0108788 A1 | 5/2007 | Shalam et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0247794 A1 | 10/2007 | Jaffe et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |

FOREIGN PATENT DOCUMENTS

| | | |
|---|---|---|
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 333 356 | 8/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-69165 A | 3/2001 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 01/33569 | 6/1995 |
| WO | WO 95/16950 | 6/1995 |
| WO | 98/17032 | 4/1998 |
| WO | WO 99/26330 | 5/1999 |
| WO | WO 99/28813 | 6/1999 |
| WO | WO 00/22820 | 4/2000 |
| WO | WO 00/39907 | 7/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | WO 03/073688 | 9/2003 |
| WO | 2004/061850 A1 | 7/2004 |
| WO | WO 2004/055637 | 7/2004 |
| WO | WO2004/084413 A2 | 9/2004 |
| WO | WO 2004/104815 | 12/2004 |
| WO | WO 2005/031737 | 4/2005 |
| WO | WO 2005/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |
| WO | WO 2006/073702 | 7/2006 |

OTHER PUBLICATIONS

"Apple Announces iTunes 2," Press Release, Apple Computer, Inc., Oct. 23, 2001.

"Apple Introduces iTunes / World's Best and Easiest to Use Jukebox Software," Macworld Expo, San Francisco, Jan. 9, 2001.

"Apple's iPod Available in Stores Tomorrow," Press Release, Apple Computer, Inc., Nov. 9, 2001.

"Nomad Jukebox," User Guide, Creative Technology Ltd., Version 1, Aug. 2000.

"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.

"12.1" 925 Candela Mobile PC, downloaded from LCDHardware. com on Dec. 19, 2002, http://www.lcdharware.com/panel/12_1_panel/default.asp.

"BL82 Series Backlit Keyboards", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].

"Digital Still Cameras—Downloading Images to a Computer," Mimi Chakarova et al., Multi/Media Reporting and Convergence, 2 pgs.

"Eluminx Illuminated Keyboard", downloaded Dec. 19, 2002, http://www.elumix.com/.

"How to Pair a Bluetooth Headset & Cell Phone", About.com; downloaded on Apr. 29, 2006 from http://mobileoffice.about.com/od/usingyourphone/ht/blueheadset_p.htm.

"Peripherals for Industrial Keyboards & Pointing Devices", Stealth Computer Corporation, downloaded on Dec. 19, 2002, http://www.stealthcomputer.com/peropherals_oem.htm.

"Poly/Optical Fiber Optic Membrane Switch Backlighting", downloaded Dec. 19, 2002, http://www.poly/optical.com/membrane_switches.html.

"Public Safety Technologies Tracer 2000 Computer", downloaded Dec. 19, 2002, http://www.pst911.com/traver.html.

"QuickTime Movie Playback Programming Guide", Apple Computer, Inc., Aug. 11, 2005.

"QuickTime Overview", Apple Computer, Inc., Aug. 11, 2005.

(56) References Cited

OTHER PUBLICATIONS

"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z....
"Taos, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http://birrell.org/andrew/talks/pjb/overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
iAP Sports Lingo 0×09 Protocol V1.00, May 1, 2006.
IEEE 1394—Wikipedia, 1995, http://www.wikipedia.org/wiki/Firewire.
Written Opinion of the International Searching Authority dated Nov. 24, 2006 in PCT Application No. PCT/US2005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for corresponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff/Arps, et al., "Straβenmusik Portable MP3/Spieler mit USB/Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0/6342420/1304/4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.
International Search Report dated Dec. 5, 2007 in PCT Application No. PCT/US2007/004810.
Written Opinion dated Dec. 5, 2007 in PCT Application No. PCT/US2007/004810.
Partial Search Report dated Sep. 6, 2007 in PCT Application No. PCT/US2007/004810.
Apple iTunes Smart Playlists, downloaded Apr. 5, 2005 from http://web.archive.org/web/20031002011316/www.apple.com/itunes/smartplaylists... pp. 1-2.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Written Opinion in Patent Application No. PCT/US2006/048738 dated Jan. 29, 2008.

(56) References Cited

OTHER PUBLICATIONS

Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How to Do Everything With Your iPod and iPod Mini", 2004, McGraw-Hill Professional, p. 33.
Office Action dated Feb. 4, 2008 in U.S. Appl. No. 11/566,072.
"Creative liefert erstes Portable Media Center aus" [Online] Sep. 2, 2004, Retrieved from the internet on Sep. 20, 2007 from http://www.golem.de/0409/33347.html>.
International Search Report dated Feb. 18, 2008 in Patent Application No. PCT/US2007/079766.
International Search Report Dated Sep. 27, 2007 in Application No. 05824296.7.
Office Action dated Apr. 4, 2008 in U.S. Appl. No. 11/212,555.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Search Report dated Mar. 20, 2008 in Patent Application No. PCT/US2007/077789.
Written Opinion dated Mar. 20, 2008 in Patent Application No. PCT/US2007/077789.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorola Inc. Schaumburg, IL. vol. 18, Mar. 1, 1993.
Notification of Reason for Rejection from PCT Application No. 2003-539048 dated Nov. 27, 2007.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Office Action dated Jun. 17, 2008 in U.S. Appl. No. 11/212,313.
Office Action dated May 30, 2008 in Chinese Patent Application No. 02825938.6.
Office Action in Japanese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association for Computing Machinery, Conference Proceedings, Apr. 5, 2003.
Office Action dated Oct. 16, 2008 in U.S. Appl. No. 11/327,544.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Nov. 16, 2009 in U.S. Appl. No. 11/144,541.
Office Action dated Jun. 24, 2009 in U.S. Appl. No. 11/519,352.
Office Action dated Jun. 2, 2009 in U.S. Appl. No. 11/530,773.
Office Action dated May 27, 2009 in U.S. Appl. No. 11/439,613.
Office Action dated Jan. 26, 2009 in U.S. Appl. No. 11/373,468.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Office Action dated Sep. 1, 2008 in EP Application No. 06 256 215.2.
Written Opinion dated Jan. 6, 2009 in Singapore Application No. 200701865-8.
Office Action dated Jun. 24, 2009 in U.S. Appl. No. 11/373,468.
Office Action dated May 11, 2009 in U.S. Appl. No. 11/680,580.
Notice of Allowance dated Apr. 21, 2009 in U.S. Appl. No. 11/327,544.
Office Action dated Mar. 30, 2009 in U.S. Appl. No. 11/515,270.
Office Action dated Apr. 9, 2009 in U.S. Appl. No. 11/583,199.
Office Action dated Jun. 22, 2009 in U.S. Appl. No. 11/515,270.
Office Action dated Dec. 11, 2009 in U.S. Appl. No. 11/519,352.
Written Opinion dated Oct. 10, 2008 in PCT Application No. PCT/US2007/077160.
Notice of Allowance dated Jun. 15, 2009 in U.S. Appl. No. 11/212,313.
Office Action dated Sep. 10, 2009 in U.S. Appl. No. 11/746,548.
Office Action dated Dec. 16, 2009 in U.S. Appl. No. 11/746,548.
Office Action dated Sep. 3, 2009 in U.S. Appl. No. 11/324,863.
Office Action dated Sep. 2, 2009 in U.S. Appl. No. 11/515,270.
Office Action dated Nov. 16, 2009 in U.S. Appl. No. 11/439,613.
Office Action dated Oct. 16, 2009 in U.S. Appl. No. 11/583,199.
Office Action dated Oct. 23, 2009 in Chinese Application No. 200580048143.9.
Office Action dated May 29, 2009 in EP Application No. 06 847 856.9.
Examination Report dated Sep. 1, 2009 in Singapore Application No. 200701865-8.
Office Action dated Mar. 9, 2010 in U.S. Appl. No. 11/519,352.
Office Action dated Mar. 24, 2010 in U.S. Appl. No. 11/583,199.
Office Action dated Mar. 25, 2010 in U.S. Appl. No. 11/297,032.
Office Action dated Mar. 10, 2010 in U.S. Appl. No. 11/583,327.
Office Action dated Mar. 11, 2010 in U.S. Appl. No. 11/830,746.
Office Action dated Mar. 4, 2010 in U.S. Appl. No. 11/324,863.
Office Action dated Feb. 3, 2010 in U.S. Appl. No. 11/439,613.
Office Action dated Dec. 14, 2009 in U.S. Appl. No. 11/535,646.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.
"Cables to Go", download Oct. 16, 2001, http://www.cablestogo.com/product.asp?cat%5Fid=601&sku=27028.
"ExpressBus™ FU010 User Guide Packing Checklist", Belkin Components.
"FireWire Connector", downloaded Oct. 16, 2001, wysiwyg://76/http://developer.apple.com/...es/Macintosh_CPUs-G3/ibook/ibook-27.html.
"FireWire", downloaded Oct. 16, 2001, wysiwyg://42/http://developer.apple.com/hardware/FireWire.
"How to Connect Your Computer, PC Hardware", downloaded Oct. 16, 2001, http:///www.scar.utoronto.ca/~ccweb/faculty/connect-howto.html.
"IEEE 1394/USB Comparison", downloaded Oct. 16, 2001, www.genitech.com.au/LIBRARY/TechSupport/infobits/firewire_vs_usb.htm.
"Making USB Work", downloaded Oct. 16, 2001, PC Magazine: PC Tech (Making USB Work) wysiwyg://55/http://www.zdnetcom/pcmag/pctech/content/18/04/tu1804.001.html.
"PMC FW2 IEEE1394 FireWire Controller", downloaded Oct. 16, 2001, http://www.bvmltd.co.uk/PMCfw2ds.html.

(56) References Cited

OTHER PUBLICATIONS

"Why FireWire is Hot!Hot!Hot!", downloaded Oct. 16, 2001, "Impact.FireWire.SideBar", http://www.vxm.com/21R.35.html.
Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.
Ian Fried, "New FireWire to blaze faster trail", downloaded Oct. 16, 2001, CNET News.com, http://news.cnet.com/news/0-1006-200-6021210.html.
International Search Report in PCT application PCT/US02/33856 dated Mar. 14, 2003.
Michael D. Johas Teener, "Understanding FireWire: The IEEE 1394 Standards and Specifications", downloaded Oct. 16, 2001, wysiwyg://9/http://www.chipcenter.com/networking/ieee1394/main.html.
International Search Report in PCT application PCT/US05/024906 dated Mar. 15, 2006.
"Introduction to Public Key Cryptography," Oct. 9, 1998, printed from http://developer.netscape.com/docs/manuals/security/pkin/contents.htm on Oct. 6, 2004.
Brentrup, "Public Key Cryptography Demystified," Campus Technology, printed from http://www.campus-technology.com/article.asp?id=7626 on Oct. 6, 2004.
Whittle, "Public Key Authentication Framework: Tutorial," First Principles Consulting, Jun. 2, 1996.
Belkin iPod Voice Recorder, Product Specification Sheet, printed Jun. 16, 2004.
International Search Report and Written Opinion dated May 15, 2006 for corresponding PCT Application No. PCT/US2005/045040.
Menezes et al., "Handbook of Applied Cryptography," Identification and Entity Authentication, pp. 385-424.
"The Authoritative Dictionary of IEEE Standard Terms", 200, IEEE Press, $7^{th}$ edition, pp. 1215.
"Firewire Finally Comes Home," Charles Severance, Computer, Nov. 1998, pp. 117-118.
Office Action dated Nov. 27, 2007 in U.S. Appl. No. 11/270,901.
International Search Report dated Feb. 18, 2008 for corresponding PCT Application No. PCT/US2007/004811.
Written Opinion dated Feb. 18, 2008 for corresponding PCT Application No. PCT/US2007/004811.
Office Action dated May 2, 2008 in U.S. Appl. No. 11/270,901.
Office Action dated May 5, 2008 in U.S. Appl. No. 11/754,932.
Office Action dated Dec. 12, 2008 in EP Application No. 07 751.563.3.
Office Action dated Nov. 14, 2008 in U.S. Appl. No. 11/270,901.
Office Action dated Jan. 13, 2009 in U.S. Appl. No. 11/754,932.
Office Action dated Oct. 15, 2008 in U.S. Appl. No. 11/754,932.
Office Action dated Jul. 30, 2009 in U.S. Appl. No. 11/754,932.
LTC1735-1, High Efficiency Step-Down Switching Regulator, Linear Technology Corporation, pp. 1-28.
LTC1731-4, Single Cell Lithium-Ion Linear Battery Charger Controller, Linear Technology Corporation, pp. 1-9.
Office Action dated Jun. 2, 2009 in U.S. Appl. No. 11/270,901.
Office Action dated May 15, 2009 in U.S. Appl. No. 11/754,932.
Office Action dated Oct. 29, 2009 in U.S. Appl. No. 11/754,932.

\* cited by examiner

DYNAMIC POWER MANAGEMENT IN A PORTABLE MEDIA DELIVERY SYSTEM

CROSS REFERENCE TO RELATED APPLICATIONS

This application is a divisional application of, and claims priority under 35 USC §121 to U.S. application Ser. No. 11/364,610 filed Feb. 27, 2006 now U.S. Pat. No. 7,848,527.

FIELD OF INVENTION

This invention relates generally to personal, portable electronic devices such as media players, radios and the like.

DESCRIPTION OF RELATED ART

Recent developments in consumer electronics have included the introduction of portable media players (such as MP3 players, minidisk players), cell phones, personal digital assistants (PDAs) and the like. For example, in the case of an MP3 player (or, for that matter, any other digital media playback device), a number of digitized audio files are stored in a storage medium included in or coupled to the MP3 player in a fashion deemed most suitable to the user. Until recently, the listening enjoyment of these stored music files was typically limited to the use of earphones or other individual listening devices preventing the user from providing a listening experience to a group of devotees. In order to provide such a listening experience, a number of portable accessories having comparatively large speakers have been developed. Such portable accessories are often known as speaker systems or speaker docks. In any case, the portable accessories provide for broadcasting of music to more than a single user. Unfortunately, however, the power requirements to drive the comparatively large speakers such as the portable accessory far outweigh the power requirement of the portable media player.

Therefore, there is a need for improved approaches to provide and manage power consumption and preserving overall power consumption of a consumer electronic product by limiting power used to drive speakers.

SUMMARY OF THE INVENTION

A method for managing power in a media delivery system arranged to output audio by way of one or more speakers is described. A consumer electronic product includes a portable media player arranged to playback a selected one of a plurality of media files stored therein connected to a media delivery accessory unit having at least one speaker. When the consumer electronic product is operating in a DC mode, a maximum allowable sound pressure level (SPL) of an output audio signal that can be produced by the at least one speaker is set to a DC maximum allowable SPL.

In another embodiment, a consumer electronic product operable in a DC mode and an AC mode is described that includes a portable media player arranged to playback a selected one of a plurality of media files stored therein and a media delivery accessory unit electrically coupled to the portable media player having at least one speaker. When the consumer electronic product is operating in the DC mode, a maximum allowable sound pressure level (SPL) of an output audio signal that can be produced by the at least one speaker is set to a DC maximum allowable SPL.

In yet another embodiment, a method of shutting down a consumer electronic product so as to avoid generation of audio artifacts is performed by determining if a shutdown is imminent and muting an audio amplifier. A user feedback indicating that a loss of power is imminent is provided and if all remaining electronic components are not powered down then all remaining electronic components in the consumer electronic product are shutdown. The user feedback is continued until all residual power is exhausted.

Another embodiment provides computer program product executable by a processor for shutting down a consumer electronic product so as to avoid generation of audio artifacts. The computer program product includes computer code for determining if a shutdown is imminent, computer code for muting an audio amplifier; computer code for providing a user feedback indicating that a loss of power is imminent, computer code for powering down all remaining electronic components in the consumer electronic product if all remaining electronic components are not powered down, computer code for discontinuing the user feedback if all residual power is exhausted, and computer readable medium for storing the computer code.

Computer program product executable by a processor for shutting down a consumer electronic product so as to avoid generation of audio artifacts is also described that includes computer code for determining if a shutdown is imminent, computer code for muting an audio amplifier, computer code for providing a user feedback indicating that a loss of power is imminent, computer code for powering down all remaining electronic components in the consumer electronic product if all remaining electronic components are not powered down, computer code for discontinuing the user feedback if all residual power is exhausted, and computer readable medium for storing the computer code.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

A consumer electronic product in the form of a portable media delivery system is described. In particular, when the consumer electronic product (e.g., a portable media player connected to a media delivery accessory having a plurality of speakers) is powered by a limited capacity DC power source (such as a battery or mini-fuel cell), the consumer electronic product limits the maximum allowable sound pressure level (SPL) that can be produced by the speakers. In one embodiment, the limitation of the maximum allowable SPL is based upon an amount of stored charge available in the limited capacity DC power source or in some cases an intermediate storage capacitor.

In the described embodiment, the media delivery accessory includes a processor, an audio output device, and limited capacity DC power source coupled to an external power unit by way of a power cable. The portable media player is arranged to store any number and type of suitably formatted digital multimedia data files that are ultimately selected by a user for playback. It should also be noted, that in a particularly useful embodiment, the media delivery accessory includes a user interface that provides user input signals to the accessory. In this way, the accessory performs a limited control function for the media delivery system by, for example, increasing or decreasing the sound volume produced at a speaker unit coupled thereto.

The invention will now be described in terms of a consumer electronic product that includes a portable media player capable of storing a number of multimedia digital data files connected to a media delivery accessory arranged to broadcast audio by way of a plurality of speakers. In the case of the media player being a pocket sized portable player (such as the IPOD™ player manufactured by the Apple Inc. of Cupertino, Calif.), the multimedia data files can include MP3 files as well as any other appropriately formatted data files.

Figure 1:
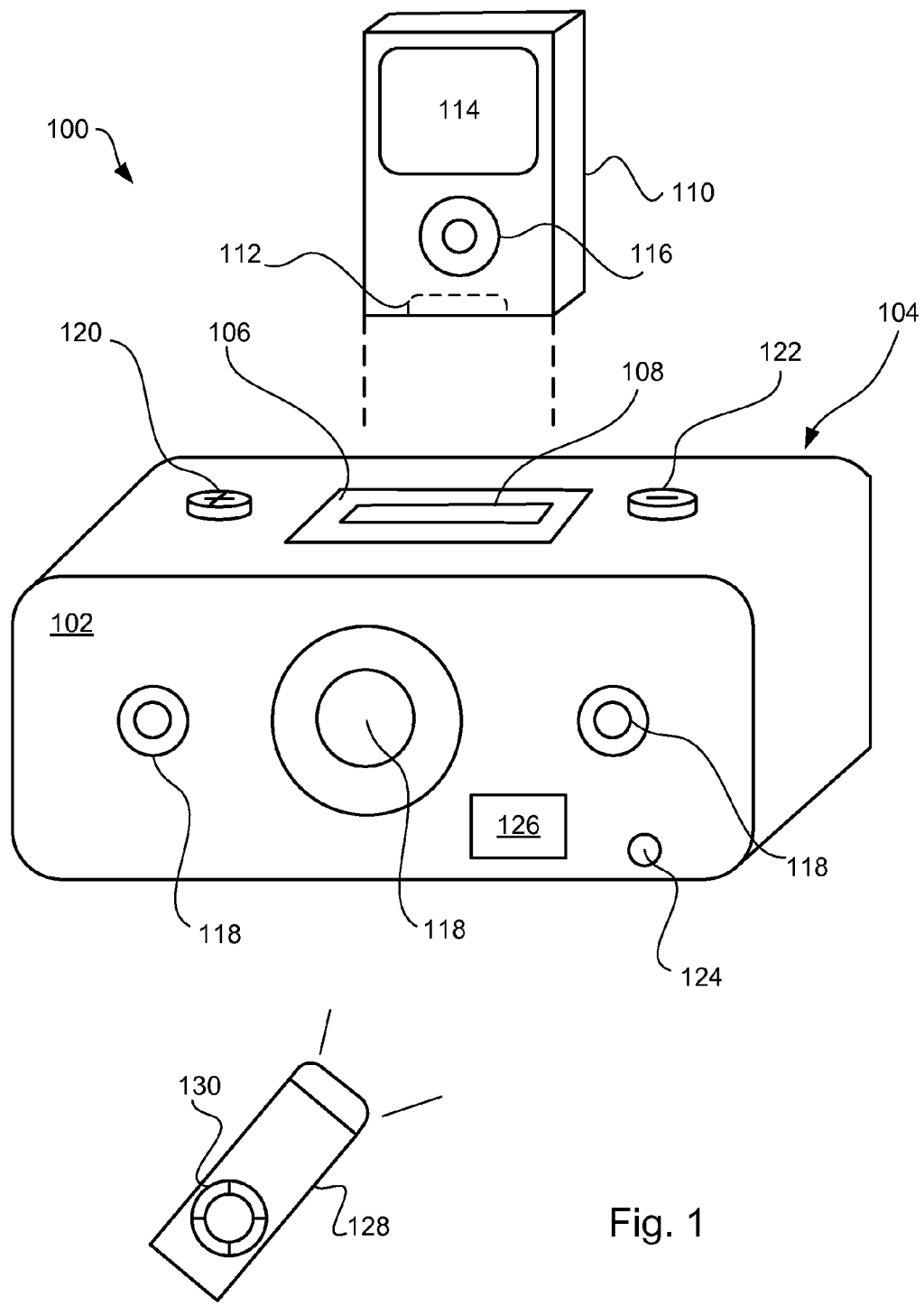
FIG. 1 shows a media system in accordance with an embodiment of the invention.

FIG. 1 is a diagram of a media system 100 according to one embodiment of the invention. The media system 100 includes a media delivery accessory 102. The media delivery accessory 102 serves to output media, such as outputting audio sounds. For example, the audio sound can pertain to music. The media delivery accessory 102 includes a housing 104 that supports or contains various components of the media delivery accessory 102. The housing 104 includes an opening or receptacle 106 and a connector 108 disposed therein. Beyond the media delivery accessory 102, the media system 100 also includes a portable media player 110. The portable media player 110 is, more generally, a portable computing device, such as the mobile computing device 200 illustrated in FIG. 2. Although the portable media player 110 is fully operational apart from the media delivery accessory 102, the portable media player 110 can be connected to the media delivery accessory 104. In particular, the portable media player 110 includes a connector 112. The portable media player 110 can be placed in the opening or receptacle 106 such that the connector 108 physically and electrically connects with the connector 112 of the portable media player 110, thereby connecting the portable media player 110 to the media delivery accessory 104. It should also be noted that in some cases the connection can be made wireles sly using a WiFi type wireless interface, for example.

The media delivery accessory 102 includes a plurality of speakers 118. In one embodiment, the speakers 118 include a pair of midrange speakers and a subwoofer speaker. The housing 104 also includes volume control devices 120 and 122. In one embodiment, the volume control devices 120 and 122 are buttons. Still further, the housing 104 can include an indicator light 124 that provide visual feedback to the user regarding the operation or condition of the media delivery accessory 102. The housing 104 can also include a receiver window 126 that can be used by a receiver internal to the housing 104 when picking-up wireless transmissions from a remote controller 128 having a plurality of user input controls 130. It should be noted that the remote controller 128 can transmit any of a number of signals such as infrared, radio frequency (RF), audio signals, and the like. Through use of the user input controls 130 on the remote controller 128, the user is able to indirectly interact with the portable media player 110 or directly interact with the media delivery accessory 102. For example, the user of the remote controller 128 can interact with the user input controls 130 to select a media item to be played on the portable media player 110 with its audio output being provided by the speakers 118 of the media delivery accessory 102. The remote controller 128 can also be used to alter the volume of the audio output from the media delivery accessory 102.

Figure 2:
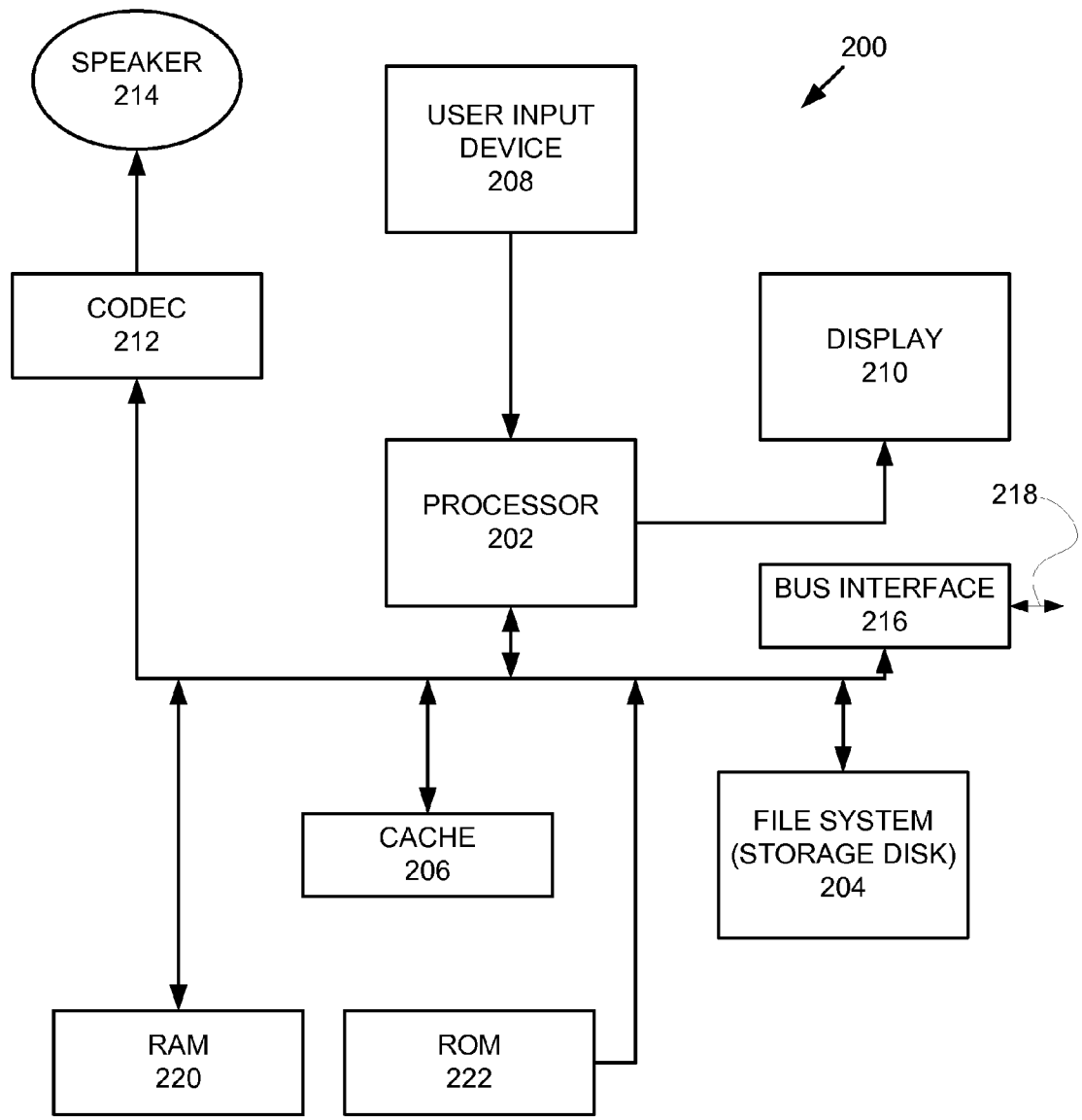
FIG. 2 shows a portable media player according to one embodiment of the invention.

FIG. 2 shows a portable media player 200 according to one embodiment of the invention. The media player 200 is, for example, suitable for use as the battery powered portable media player 110 shown in FIG. 1. The media player 200 includes a processor 202 that pertains to a microprocessor or controller for controlling the overall operation of the media player 200. The media player 200 stores media data pertaining to media assets in a file system 204 and a cache 206. The file system 204 is, typically, a storage disk or a plurality of disks. The file system 204 typically provides high capacity storage capability for the media player 200. However, since the access time to the file system 204 is relatively slow, the media player 200 can also include a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown). The media player 200 also includes a RAM 220 and a Read-Only Memory (ROM) 222. The ROM 222 can store programs, utilities or processes to be executed in a non-volatile manner. The RAM 220 provides volatile data storage, such as for the cache 206.

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 224 can facilitate data transfer between at least the file system 204, the cache 206, and the processor 202. The media player 200 also includes a bus interface 216 that couples to a data link 218. The data link 218 allows the media player 200 to couple to a host computer over a wired connection.

In one embodiment, the media player 200 serves to store a plurality of media assets (e.g., songs) in the file system 204. When a user desires to have the media player 200 play a particular media item, a list of available media assets is displayed on the display 210. Then, using the user input device 208, a user can select one of the available media assets. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

The media player 200 also includes a wireless network interface 226 arranged to wireles sly transmit any selected data from the media player 200 to any appropriately configured receiver unit (e.g., the wireless network interface 114) over a wireless network. In the embodiment shown in FIG. 1, the wireless network interface 226 that takes the form of, for example, a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard.

In one embodiment, the media player 200 is a portable computing device dedicated to processing media such as audio. For example, the media player 200 can be a media player (e.g., MP3 player), a game player, a remote controller, a portable communication device, and the like. These devices are generally battery-operated and highly portable so as to allow a user to listen to music, play games or video, record video or take pictures, communicate with others, and/or control other devices. In one implementation, the media player 200 is a handheld device that is sized for placement into a pocket or hand of the user. By being handheld, the media player 200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Figure 3:
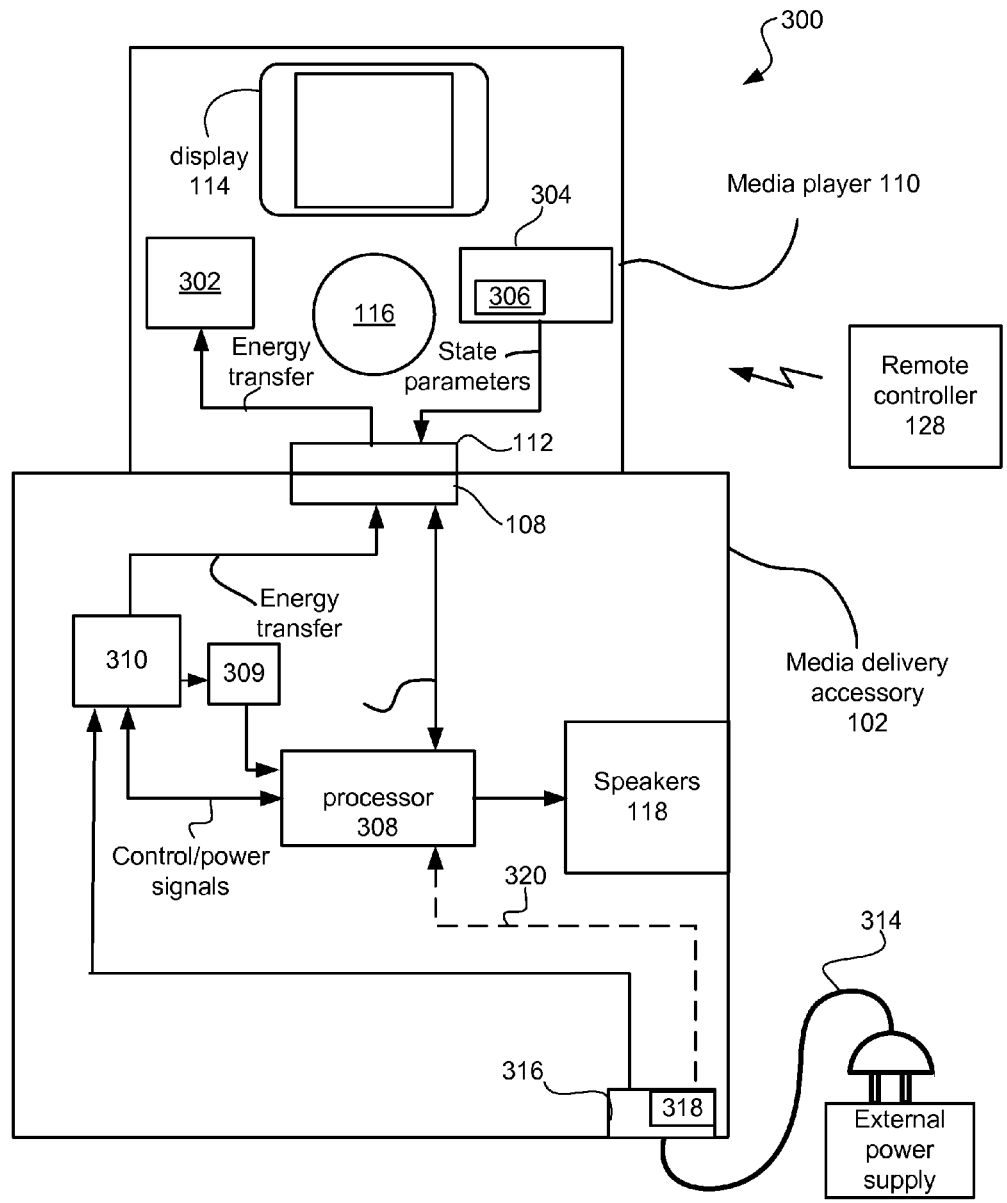
FIG. 3 shows a consumer electronic product in accordance with an embodiment of the invention.

FIG. 3 shows a consumer electronic product 300 in accordance with an embodiment of the invention. In the described embodiment, the consumer electronic product 300 is formed when the portable media player 110 is placed in the opening of receptacle 106 such that the connector 108 physically and electrically connects with the connector 112 of the portable media player 110 thereby creating a data/power pathway between the portable media player 110 and the media delivery accessory 102. The media player 102 includes a media player internal power supply 302 arranged to store energy used to power to media player 110 before (i.e., booting up) and during playback of selected digital media files. The media player 110 also includes a memory unit 304 suitably arranged to store, in addition to media files, media player operational parameters 306 indicative of an operating state of the media player 110. For example, the media player operational parameters 306 can include an indication of whether or not a backlight used to illuminate the display 114 is operational, and if so, the duration of time and intensity of the backlight. The media player operational parameters 306 can also include a current stored energy state indicating an amount of available useful energy that is stored in the internal power supply 302.

The media delivery accessory 102 also includes a processor unit 308 coupled to an internal power supply monitor 309 arranged to monitor a charge status of a media delivery accessory internal power supply 310 that is used to provide power to the speakers 118. In the described embodiment, the internal power supply monitor 309 includes a capacitor 312 that is coupled to the media delivery accessory internal power supply 310 in such a way that a capacitor voltage $V_c$ across the capacitor 312 correlates to the charge status of the internal power supply 310. It should be noted that the internal power supplies 310 and 302 are contemplated to be any of a number and type of DC internal power supplies suitable for portable applications such as a battery (alkaline, nickel metal hydride, etc.) or a small fuel cell.

A detachable power cable 314 provides power to the internal power supply 310 from an external power supply when connected to a power port 316. In a particularly useful embodiment, the power port 316 includes a power cable sensor 318 that reacts to a power cable connect/disconnect event by sending a power cable status signal 320 to the processor unit 308 that signals in the case of a disconnect event that the consumer electronic product 300 is in a self powered mode (i.e., power is supplied only by the internal power supplies 310 and 302).

Figure 4A:
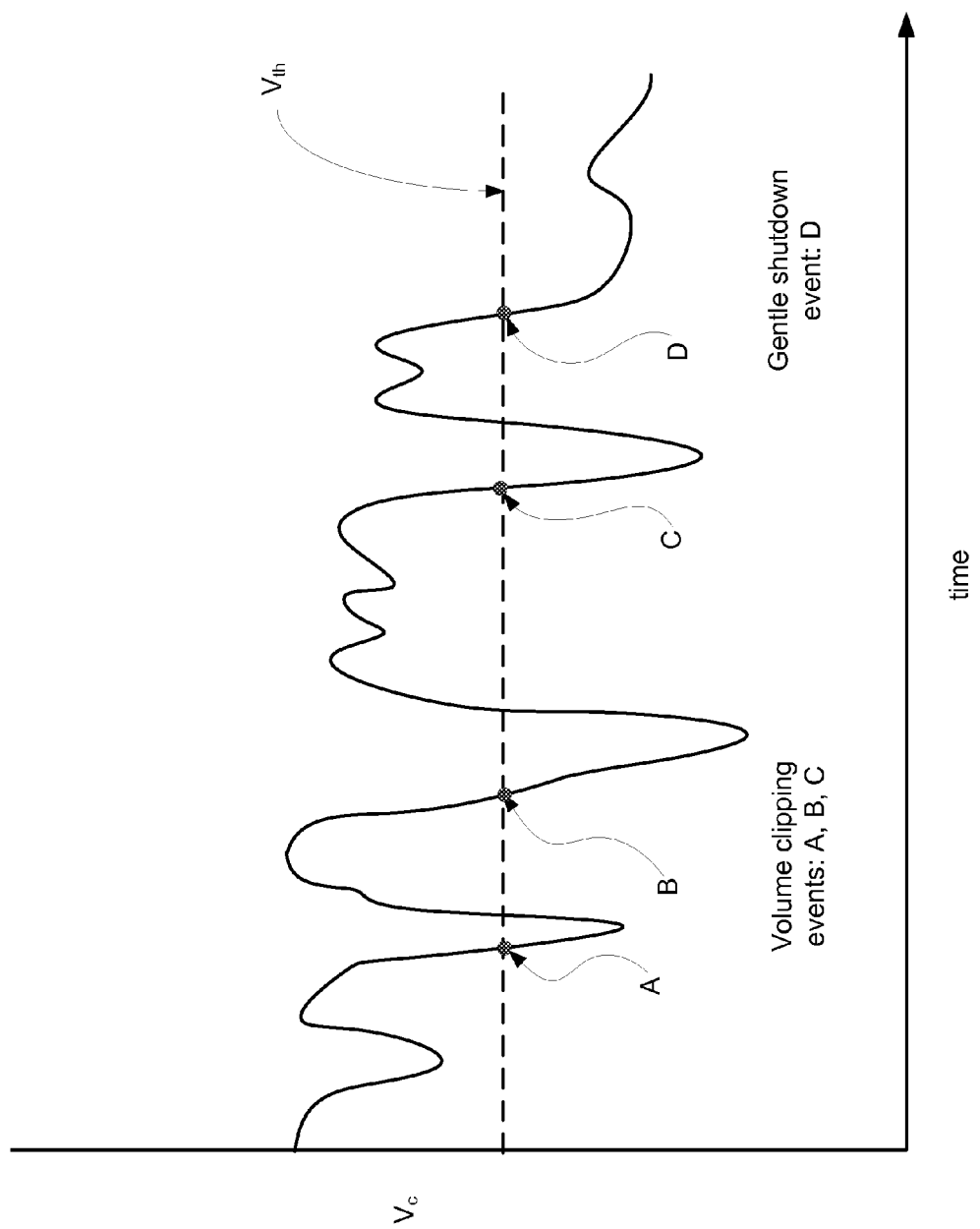
FIGS. 4A-4B illustrates a monitored capacitor voltage and charge status, respectively, in accordance with an embodiment of the invention.
Figure 4B:
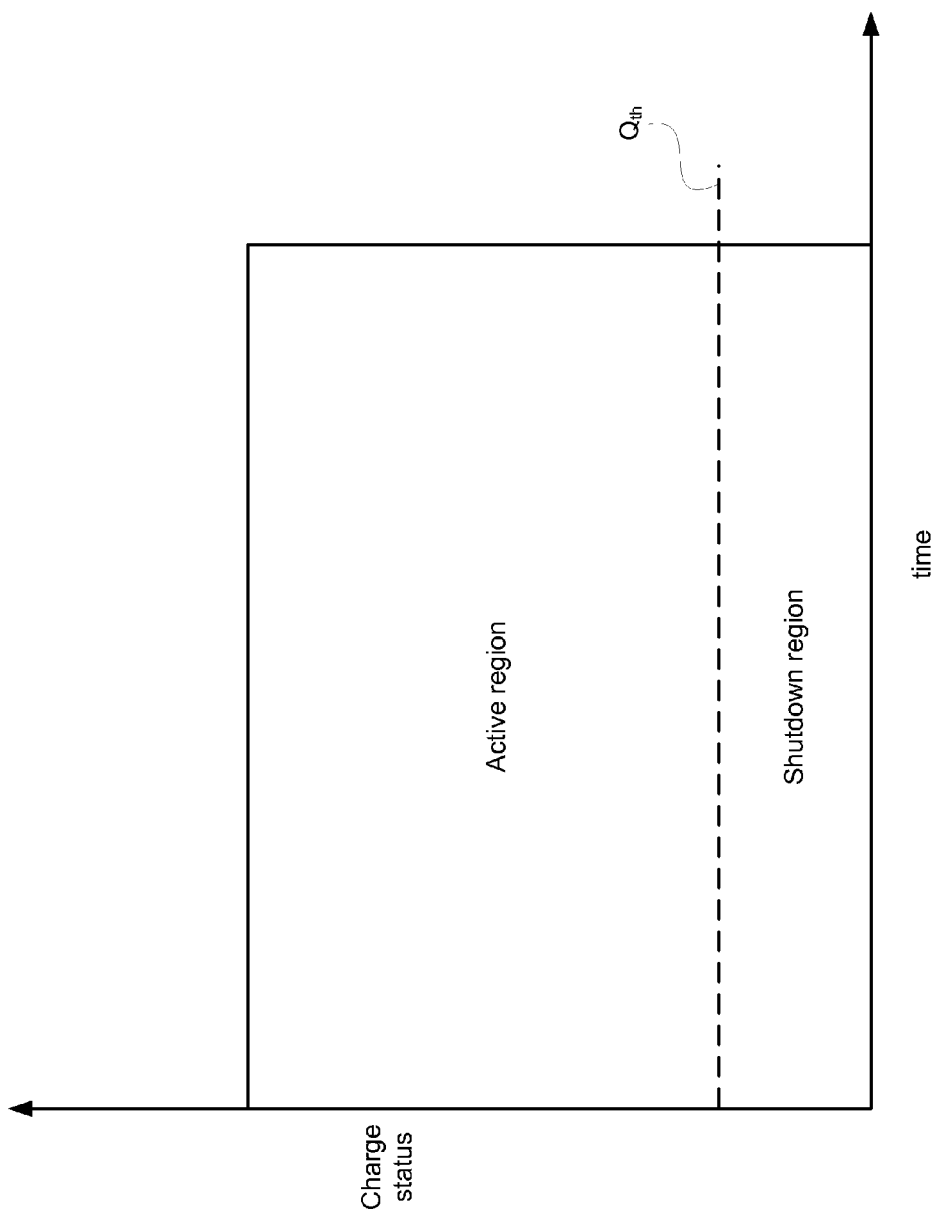

During operation of the consumer electronic product 300 when the internal power supply 310 is providing power to the speakers 118, the monitor 309 tracks the capacitor voltage $V_c$ in real time as illustrated in FIG. 4A. In the described embodiment, the voltage fluctuations are used to modify the SPL of the speakers 118 when the charge status of the internal power supply 310 is in an active region as indicated in FIG. 4B. It should be noted that when the charge status falls below a threshold value $Q_{th}$, the charge status is in what is referred to as a shutdown regime. Furthermore, since an amount of charge $Q_c$ stored in the internal power supply 310 correlates to the energy E (joules) stored in a capacitor having a capacitance C (farads) is related to the capacitor voltage $V_c$ by equation $E=CV_{24}$. Therefore, $\Delta E$ (and therefore $\Delta Q_c$) is directly proportional to $\Delta V_c$. In the self-powered mode, the internal power supply 310 provides all the necessary electrical energy to drive the speakers 118. The speakers 118, in turn, mechanically convert this electrical energy to acoustic energy that can be measured as a sound pressure level (SPL) perceived by the human ear as a volume level. Therefore, in order to reduce the amount of charge drained from the internal power supply 310 and therefore extend the operation of the consumer electronic product 300, the maximum allowable SPL of the speakers 118 is reduced. In this way, the charge stored in the energy storage device 310 is preserved, prolonging the operation of the consumer device 300 without noticeably affecting a user's enjoyment of same.

Figure 5:
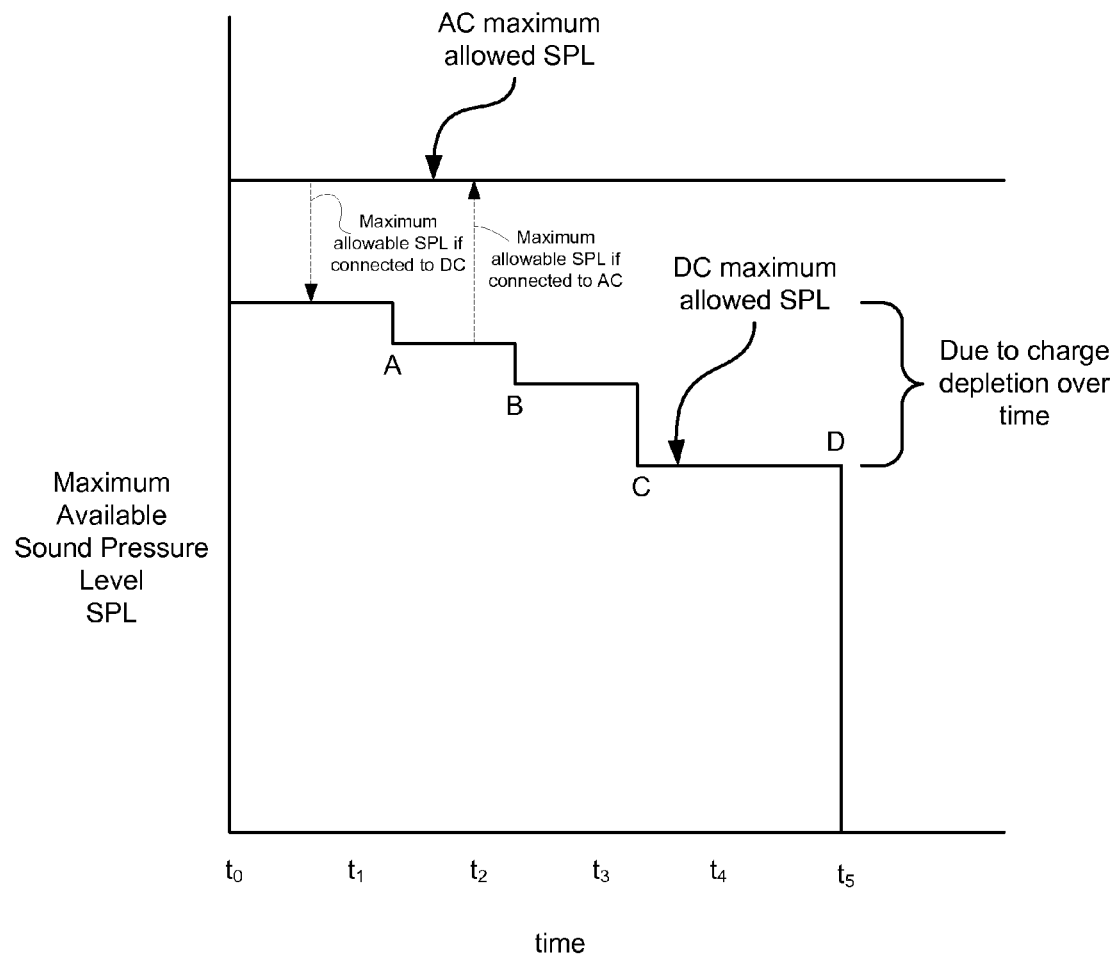
FIGS. 5-7 illustrate a speaker output for consumer electronic product in DC operating mode in accordance with an embodiment of the invention.

In order to quantify this reduction in SPL, the monitor 309 tracks the capacitor voltage $V_c$ (typically in a range of 200-300 volts) in real time (as in FIG. 4A) and whenever the tracked capacitor voltage Vc has an down-going voltage transition 400 that crosses a threshold voltage $V_{TH}$ (about 180-200 volts) and re-crosses the threshold during a subsequent up-going voltage transition, the monitor 309 notifies the processor 308 that a volume clipping event has occurred (noted as A, B, and C). This notification is communicated by the monitor 309 to the processor 308 by way of a volume clipping signal $V_{CL}$. The processor 308 responds to the volume clipping signal $V_{CL}$, by decreasing the maximum available sound pressure level of the speakers 118 by a SPL reduction factor ASPL (see FIG. 5). In this way, the remaining available stored charge in the internal power supply 310 is preserved resulting in a longer playtime for the consumer electronic product 300 than would otherwise be available. In those situations, however, then the tracked capacitor voltage $V_C$ has an down-going voltage transition 400 that crosses a threshold voltage $V_{TH}$ and does not subsequently re-cross the threshold during a subsequent up-going voltage transition, the monitor 309 notifies the processor 308 that a gentle shutdown event has occurred (noted as D). The processor 308 then gently shuts down the system in order to avoid audio artifacts.

Figure 6:
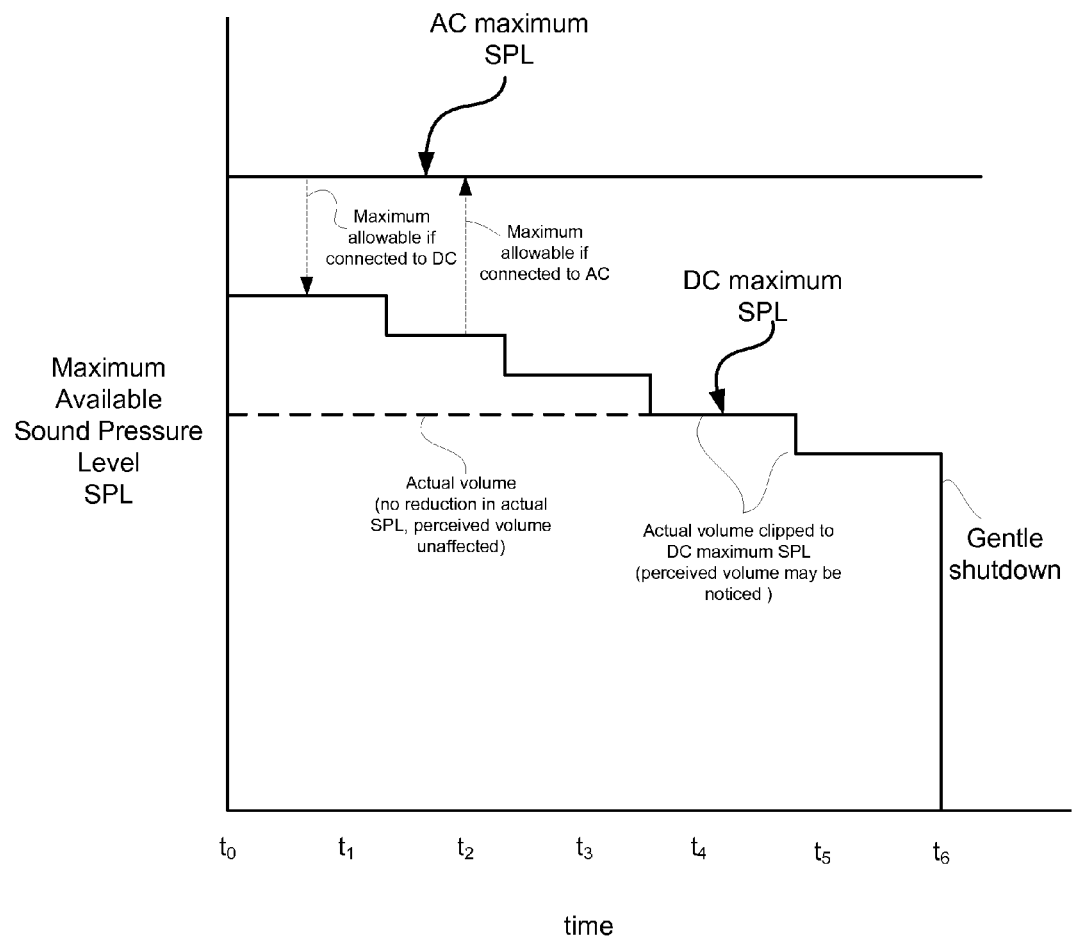

It should be noted, in those situations where a user set output SPL (using a volume control input) is less than the maximum allowable SPL (see FIG. 6), there is no reduction is output SPL (or perceived volume). However, in those cases where the maximum allowable SPL is reduced due to a clipping event and that clipping event induced reduction in SPL causes the output SPL to exceed the new maximum allowable SPL, then the user set output SPL is reduced to a level no greater than the most recent maximum allowable SPL. In this case, there remains the possibility that a user would notice a reduced perceived volume of any audio from the speakers 118. However, it is reasonable that the volume reduction would be slight and barely noticed.

As the charge stored in the internal power supply 310 decreases with usage over time, every subsequent volume clipping event causes the processor 308 to reduce the maximum allowable SPL by the SPL reduction factor ASPL. However, at some point (t=$t_5$ in FIG. 5) down going voltage fluctuations cross a second, lower threshold indicating that the internal power supply 310 no longer has sufficient stored charge to operate the media delivery accessory 102 in satisfactory manner (i.e., the speakers 118 can no longer be adequately driven to produce an acceptable SPL, resulting in unacceptably low perceived volume). At this point, the processor 308 executes what is referred to as a graceful shutdown by sending a muting signal to the output audio processor concurrently with shutting down power to the remaining components in the consumer electronic product 300. Such components include any digital signal processing circuitry, audio amplifiers, and any other related subsystems.

It should be noted that at any time the power cable 314 is connected to the external power supply while the media delivery accessory 102 is operating in the self powered mode, the processor 308 immediately signals the media delivery accessory 102 to enter an external power mode. In the external power mode (also referred to as the AC mode), the maximum allowable SPL reverts to the AC mode maximum allowable SPL affording the user the ability to increase the perceived audio volume accordingly. However, it is well to note that this increase in allowable SPL is only a potentiality and does nothing to increase the already set output SPL of the consumer electronic product 300 (i.e., the perceived volume is unchanged unless user action is taken). Conversely, when the power cable is disconnected and the media delivery accessory 102 goes from the AC mode into the self powered, or DC mode, the maximum allowable SPL is reduced to the DC mode maximum allowable SPL. In this situation, the processor 308 determines an amount of charge stored in the internal power supply 310 and based upon that determination sets the maximum SPL level accordingly. For example, if the transition from the AC to DC mode occurs when the internal power supply 310 is fully charged, then the maximum SPL level is set to $SPL_{DCO}$, whereas if the energy stored in the internal power supply 310 is less than fully charged, then the maximum $SPL_{DC}$ level is set to a lesser value, such as $SPL_{283}$, $SPL_{284}$, and so on.

In some embodiments, the energy provided by the external power supply by way of the cable 314 is used to not only operate the consumer electronic product 300, but to recharge (if necessary) the internal power supplies 302 and 310. In this case, a transition from DC mode to AC mode and back to DC mode again can result in the processor 308 setting the maximum allowable $SPL_{DC}$ at a higher level than would otherwise be the case with no recharging.

Figure 7:
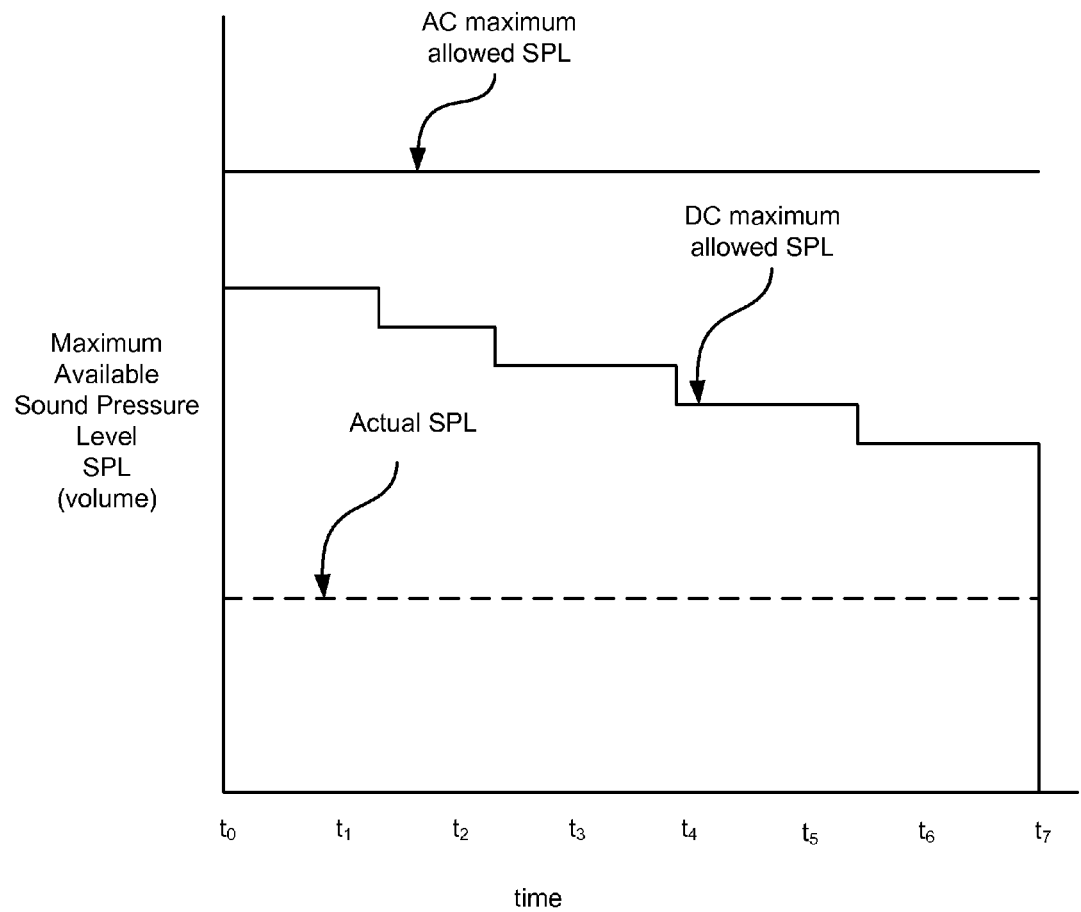

FIG. 7 illustrates a causal relationship between the period of time of useful operation of the consumer electronic product 300 and the actual output SPL of the speakers 118. It is not surprising when the actual output SPL is reduced (and the charge drain from the internal power supply 310 is concomitantly reduced), the length of time $t_7$ that the consumer electronic product 300 can operate in a satisfactory manner is extended. (This can also be seen in FIG. 6 where the actual SPL is less than the DC maximum allowable SPL from $t_0$ to approximately $t_4$.

Figure 8:
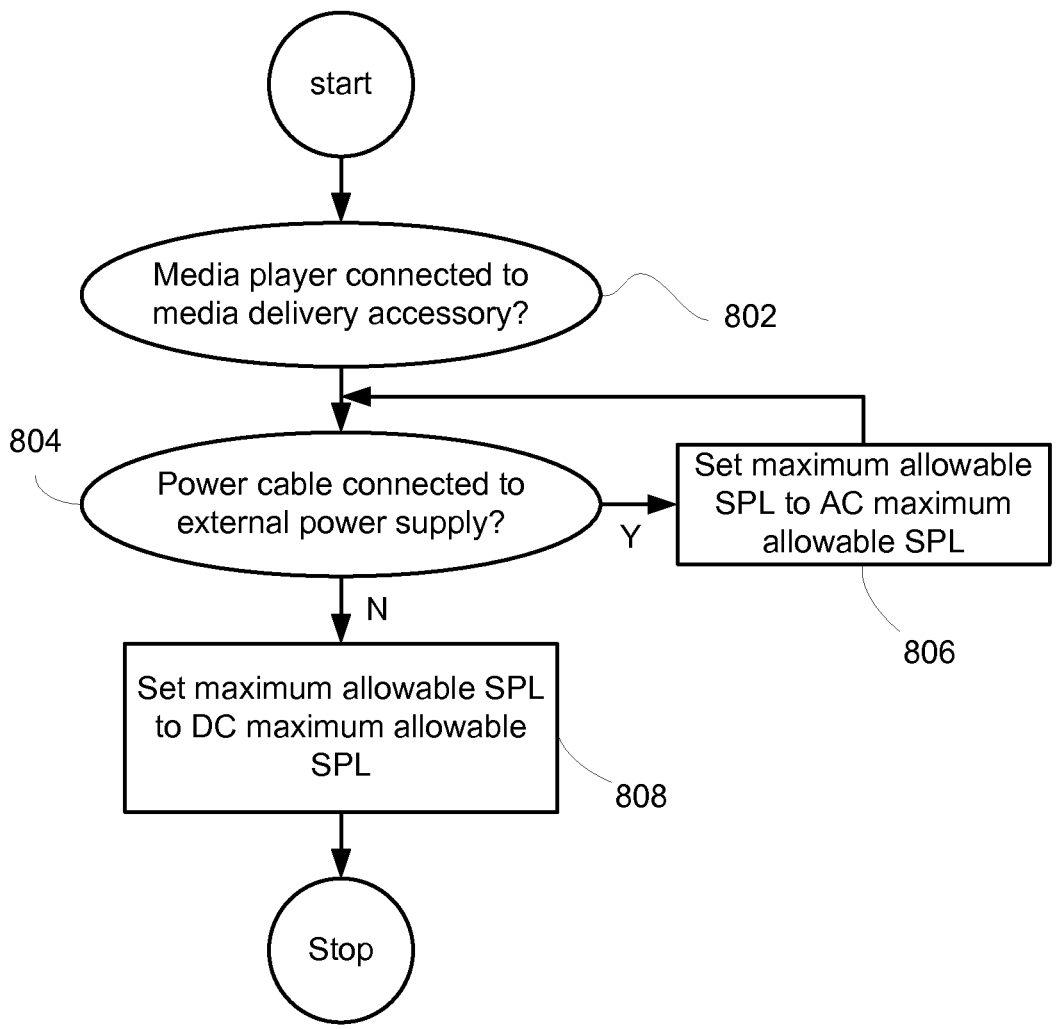
FIG. 8 shows a flowchart detailing a process in accordance with an embodiment of the invention.

FIG. 8 shows a flowchart detailing a process 800 in accordance with an embodiment of the invention. The process 800 begins at 802 by determining if the media player is connected to the media delivery accessory. When connected, a determination is made at 804 if the power cable is connected to an external power supply. It should be noted that this determination can be accomplished in any number of ways. For example, the determination can be performed by physically detecting the cable or electrically sensing an AC input voltage. In the case where the power cable is connected to the external power supply, then at 806, then maximum allowable sound pressure level (SPL) for the speakers is set to AC maximum allowable SPL. It should be noted that a processor is continually monitoring for a power cable connect and disconnect event that would in turn change the operating mode from externally powered mode (AC mode) to self powered mode (DC mode) respectively. Returning to 804, if the power cable is not connected to the external power supply (DC mode), a maximum allowable sound pressure level (SPL) for the speakers is set to DC maximum allowable SPL based upon the monitoring of the energy output of the stored energy unit.

Figure 9:
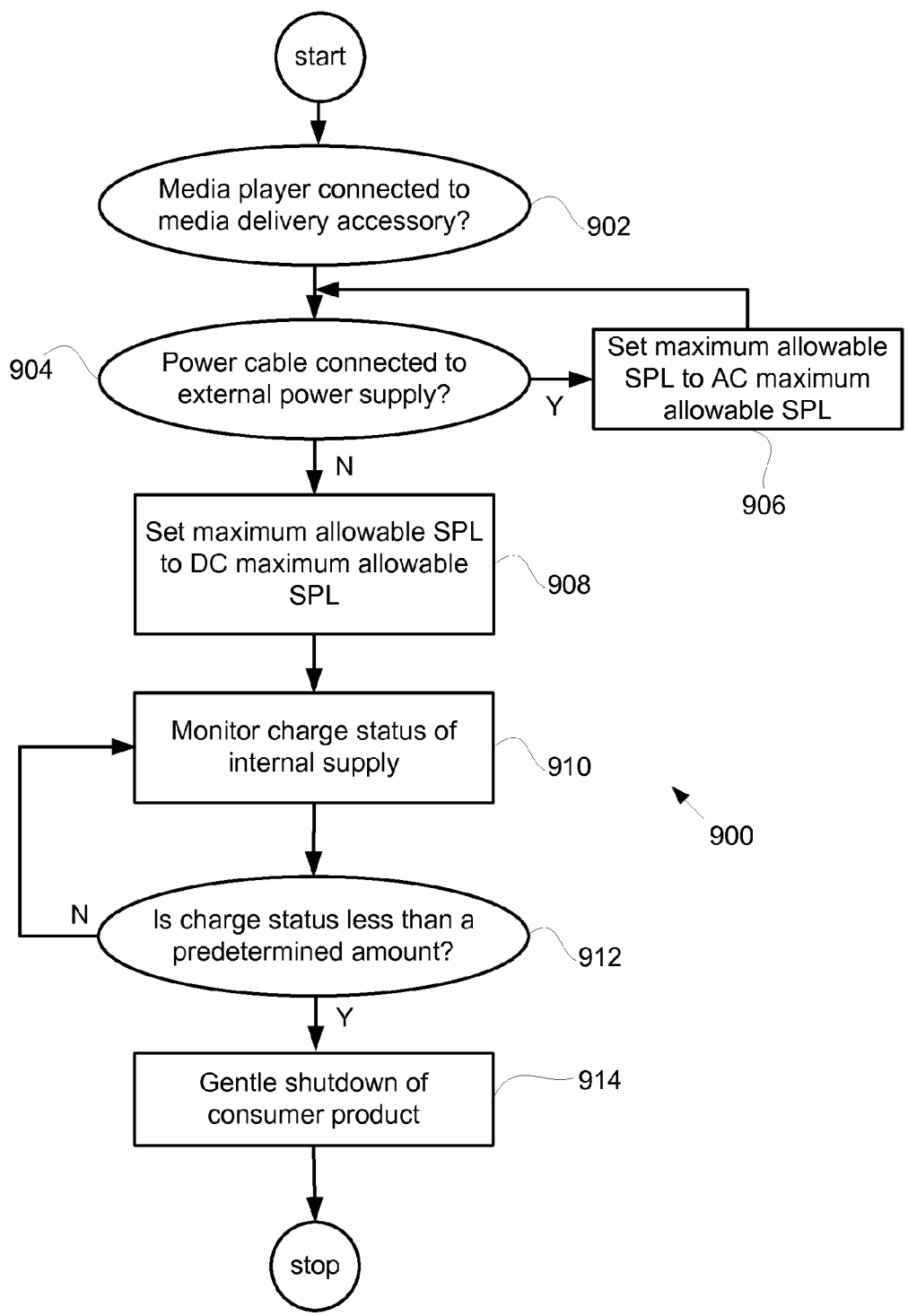
FIG. 9 shows a flowchart detailing a process in accordance with an embodiment of the invention.

FIG. 9 shows a flowchart detailing a process 900 in accordance with another embodiment of the invention. The process 900 begins at 902 by determining if the media player is connected to the media delivery accessory. When connected, a determination is made at 904 if the power cable is connected to an external power supply. In the case where the power cable is connected to the external power supply, then at 906, then maximum allowable sound pressure level (SPL) for the speakers is set to AC maximum allowable SPL. On the other hand, if the power cable is not connected to the external power supply (DC mode), then at 908 a maximum allowable sound pressure level (SPL) for the speakers is set to DC maximum allowable SPL based upon the monitoring of the charge status of the stored energy unit. At 910, a charge status of an internal power supply is monitored and if at 912 the charge status is less than a threshold value, then the consumer electronic product is shutdown at 914. On the other hand, if the charge status at 912 is found to be greater than the threshold value then control is passed back to 910.

Figure 10:
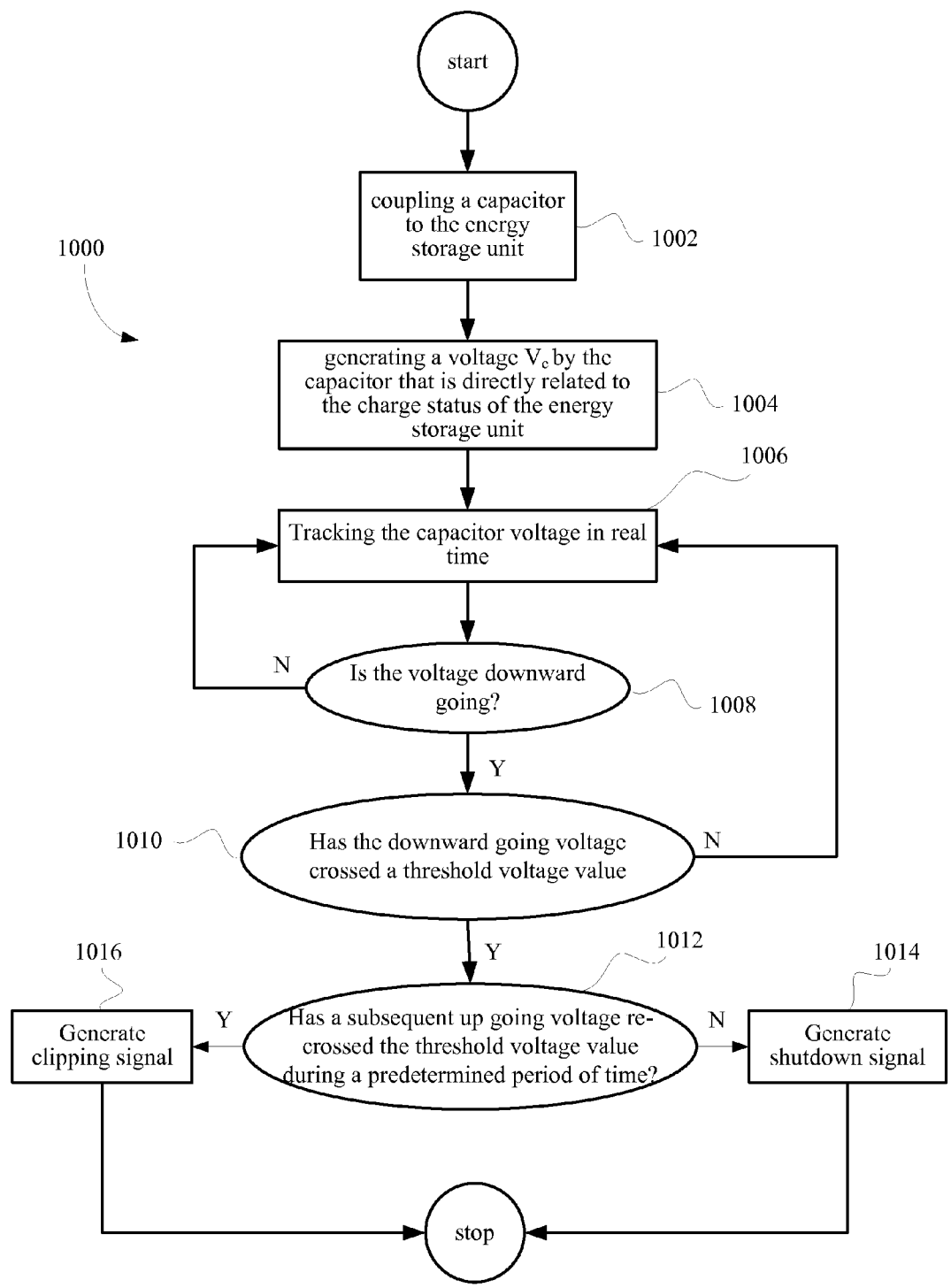
FIG. 10 shows a flowchart detailing a process in accordance with an embodiment of the invention.

FIG. 10 shows a process 1000 for monitoring the charge status of the internal power supply in accordance with an embodiment of the invention. More particularly, the process 1000 represents a particular implementation of the monitoring operation described above with reference to step 910 in the process 900 shown in FIG. 9. Accordingly, the process 1000 begins at 1002 by coupling a capacitor to the internal power supply. At 1004, a voltage $V_c$ is generated by the capacitor that is directly related to the charge status of the internal power supply. At 1006, the capacitor voltage is tracked in real time and at 1010 a determination is made whether the tracked voltage is downward going. If the tracked voltage is downward going, a determination is made whether or not the downward going voltage has crossed a clipping event threshold at 1012. If, at 1014, the downward going voltage has crossed the clipping event threshold but a subsequent upward going voltage (if any) does not re-cross the clipping event threshold within a predetermined amount of time, then at 1016 the monitor generates a shutdown signal that instructs the processor to carefully control the shutdown of the system in order to avoid undesired audio artifacts. Otherwise, the monitor generates a clipping event signal at 1016. It should be noted that the clipping event signal can also be proportional to an amount of time that the upward going voltage is below the threshold indicating a weakened state of the internal power supply.

Figure 11:
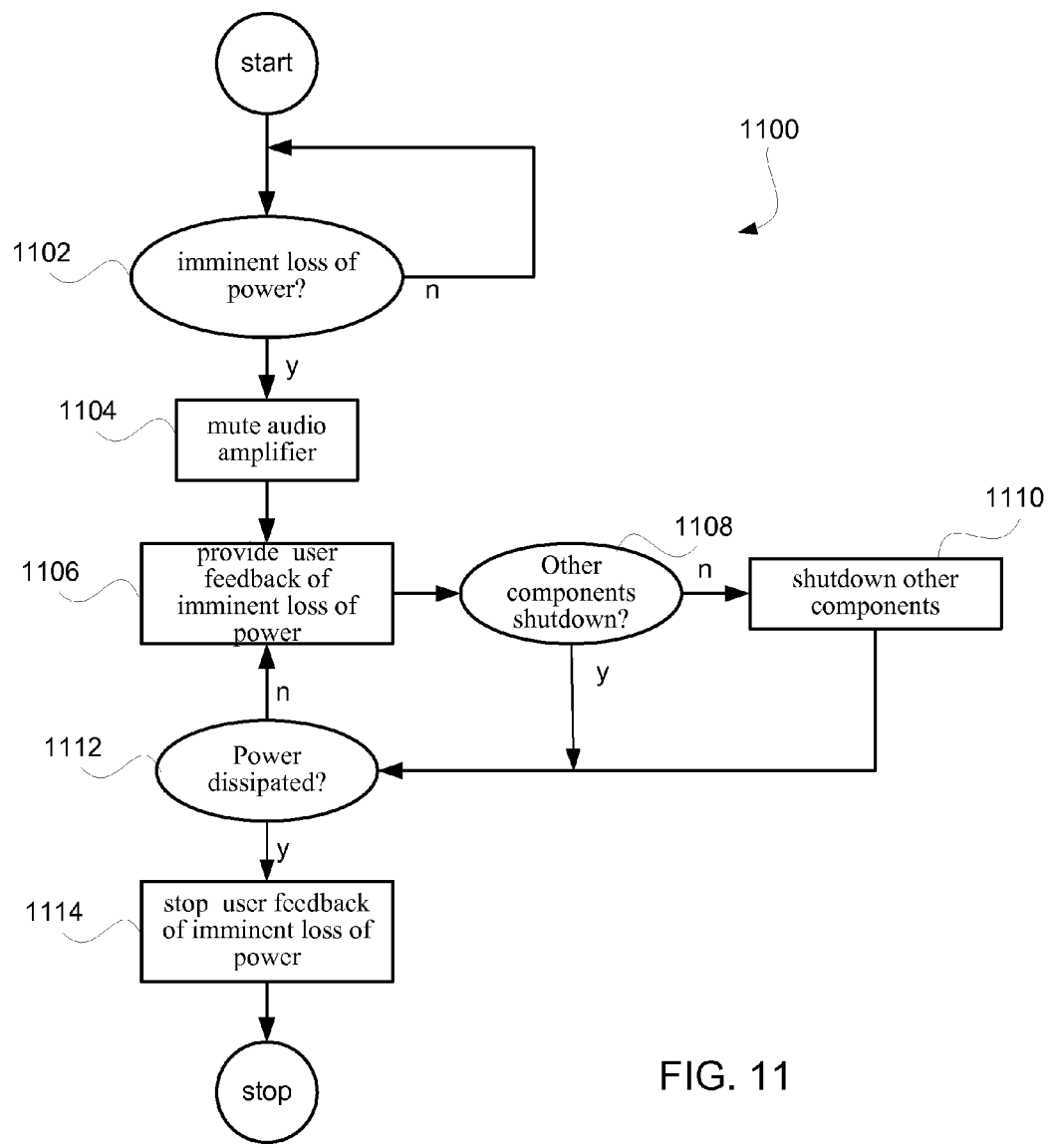
FIG. 11 shows a flowchart detailing a process for shutting down the consumer electronic product in accordance with an embodiment of the invention.

FIG. 11 shows a flowchart detailing a process 1100 for gently shutting down the consumer product in accordance with an embodiment of the invention. At 1102 a determination is made whether or not there is an imminent loss of power expected. In the described embodiment, the shutdown signal is used to notify the processor to begin gently shutting down the consumer electronic product. Once it has been determined that loss of power is imminent, then at 1104 the audio amplifier is muted in order to prevent any audio artifacts (such as a popping sound typically heard when sound systems are shut off abruptly). At 1106, a user feedback is provided indicating that a loss of power is imminent and at 1108, if all remaining electronic components are not powered down, then at 1110, all remaining electronic components are powered down. If, or when, all remaining components are powered down, then at 1112, a determination is made whether or not all residual power used to drive the gentle shutdown operation has been exhausted. In the described embodiment, the residual power is derived from the residual charge stored in the capacitor used to monitor the charge status of the internal power supply. Typically, there is sufficient stored residual charge to last approximately 5 seconds after the loss of power from the internal power supply. When all residual power has been exhausted, then at 1114, all user feedback is stopped. It should be noted, that when the consumer electronic product is powered up subsequent to the gentle shutdown, the consumer electronic product undergoes a hardware reset operation.

Figure 12:
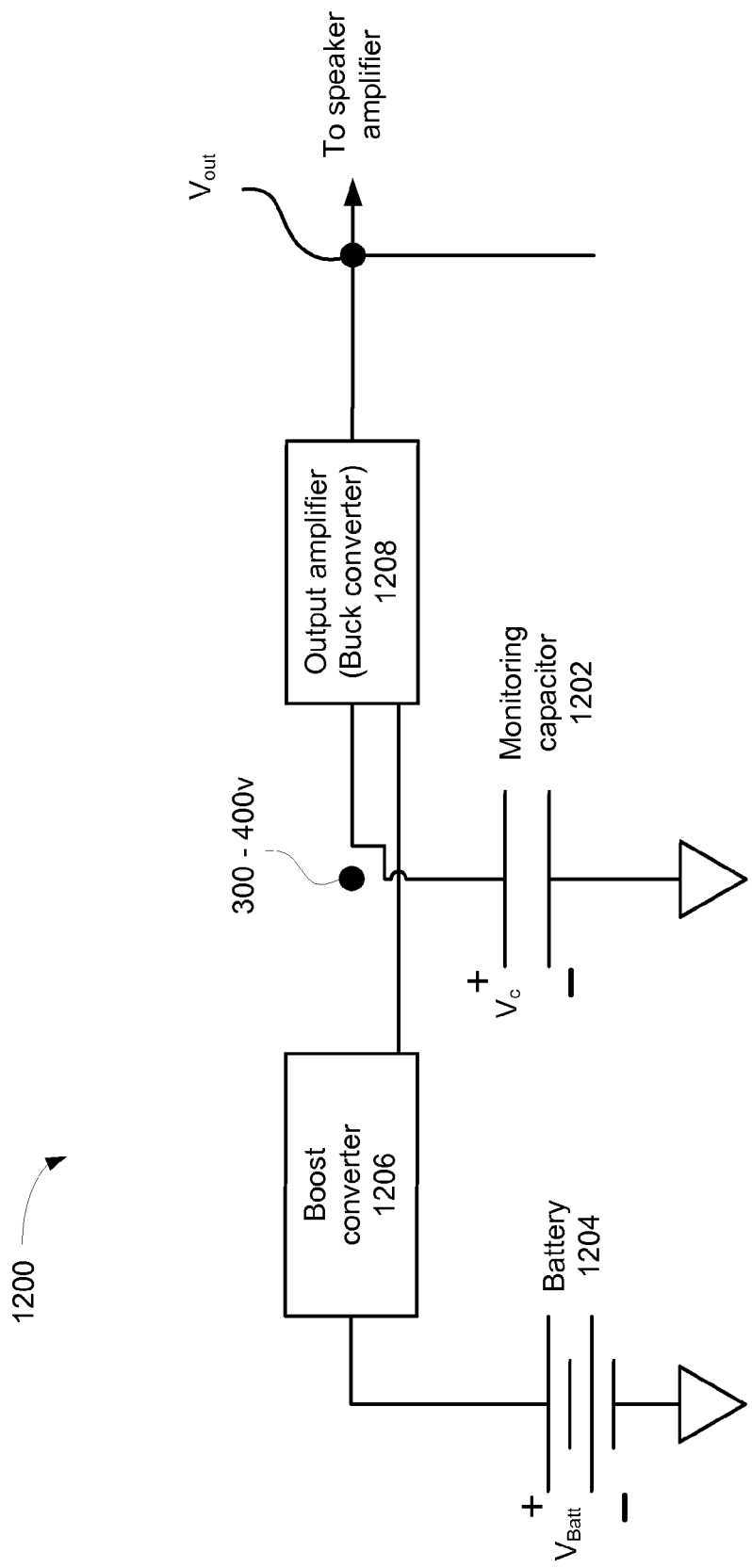
FIG. 12 shows a representative schematic diagram of a charge status monitor in accordance with an embodiment of the invention.

FIG. 12 shows a schematic diagram of a representative monitoring circuit 1200 in accordance with an embodiment of the invention. The monitoring circuit 1200 includes a capacitor 1202 capable maintaining the capacitor voltage $V_c$ on the order of 300 to 400 volts (equivalent to an energy E related to the capacitor voltage $V_c$ as $E=CV^2$ discussed above) that is used to monitor the charge status of the internal power supply. A battery 1204 (in this case, 9V) provides an input voltage $V_{batt}$ to a boost, or step up, converter 1206 that boosts the input voltage $V_{batt}$ to a range of approximately 300-400 volts that is applied to a first node of the capacitor 1202, the second of which is connected to ground. The capacitor voltage $V_c$ developed across the capacitor 1202 is used to monitor the charge status of the internal power supply. A buck (or DC to DC step down) converter 1208 also coupled to the first node of the capacitor 1202 provides an output voltage $V_{out}$ that is used by a speaker amplifier (not shown) to drive the speakers. In this way, the energy used to drive the speakers (which is ultimately provided by energy stored in the internal power supply) is reflected in the dynamic characteristics of the capacitor voltage $V_c$ as illustrated above with reference to FIG. 4A. In this way, by monitoring the capacitor voltage $V_c$, the charge status (and therefore the capability of the internal power supply to provide the requisite energy to drive the speakers) can be inferred without directly monitoring the internal power supply itself.

Although the media items of emphasis in several of the above embodiments where audio items (e.g., audio files or songs), the media items are not limited to audio items. For example, the media item can alternatively, pertain to recorded discussions and the like.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of avoiding generation of audio artifacts while shutting down a consumer electronic product, the consumer electronic product comprising a plurality of electronic components, the method comprising:
   determining that a shutdown is imminent,
   muting an audio amplifier prior to powering down the plurality of electronic components;
   providing a user feedback indicating that a loss of power is imminent;
   powering down the plurality of electronic components in the consumer electronic product; and
   discontinuing the user feedback when a residual power is exhausted.

2. A method as recited in claim 1, wherein the determining that a shutdown is imminent comprises:
   receiving a shutdown signal indicating the imminent loss of power.

3. A method as recited in claim 2, further comprising;
   receiving residual power from a stored charge in a capacitor coupled to an internal power supply used to monitor a charge status of the internal power supply prior to shutdown.

4. A method as recited in claim 3, wherein when the stored charge is depleted, then the residual power is exhausted.

5. The method of claim 1 wherein determining that a shutdown is imminent comprises determining that a voltage across one of the plurality of electronic components remains below a threshold voltage after a pre-determined length of time.

6. The method of claim 5 wherein determining that a voltage across one of the plurality of electronic components remains below a threshold voltage comprises monitoring a charge status of an internal power supply.

7. The method of claim 1 further comprising determining that the residual power is exhausted.

8. The method of claim 7 wherein determining that the residual power is exhausted comprises monitoring a charge status in the internal power supply.

9. The method of claim 5 wherein determining that a shutdown is imminent comprises determining that the voltage across one of the plurality of electronic components is below a second threshold voltage lower than the threshold voltage.

10. The method of claim 6 wherein monitoring a charge status of an internal power supply comprises coupling a step up voltage converter and a step down voltage converter to a capacitor, in the internal power supply.

11. The method of claim 1 wherein providing a user feedback indicating that a loss of power is imminent further comprises continuing the user feedback until the residual power is exhausted.

12. The method of claim 1 further comprising receiving a user feedback through a user input control in the consumer electronic product.

13. The method of claim 1 further comprising determining if a power cable is connected to an external power supply.

14. A non-transitory computer readable medium comprising a computer code that when executed by a processor circuit in a consumer electronic product causes the processor to shut down the consumer electronic product so as to avoid generation of audio artifacts, the consumer electronics product comprising a plurality of electronic components, the method comprising:

determining when a shutdown is imminent,
muting an audio amplifier prior to powering down the plurality of electronic components;
providing a user feedback indicating that a loss of power is imminent;
powering down the plurality of electronic components in the consumer electronic product;
discontinuing the user feedback when all residual power is exhausted; and
storing the computer code in the non-transitory computer readable medium.

15. The non-transitory computer readable medium as recited in claim 14, wherein the computer code for determining if a shutdown is imminent comprises:
computer code for receiving a shutdown signal indicating the imminent loss of power.

16. The non-transitory computer readable medium as recited in claim 15, further comprising;
computer code for receiving residual power from a stored charge in a capacitor coupled to an internal power supply used to monitor a charge status of the internal power supply prior to shutdown.

17. The non-transitory computer readable medium as recited in claim 16, wherein when the stored charge is depleted, then the residual power is exhausted.

18. The computer readable medium of claim 14 wherein determining that a shutdown is imminent comprises determining that a voltage across one of the plurality of electronic components remains below a threshold voltage after a pre-determined length of time.

19. The computer readable medium of claim 18 wherein determining that a voltage across one of the plurality of electronic components remains below a threshold voltage comprises monitoring a charge status of an internal power supply.

20. The computer readable medium of claim 14 wherein the method further comprises determining that the residual power is exhausted.

* * * * *